United States Patent [19]

Balchin et al.

[11] Patent Number: 5,571,963
[45] Date of Patent: Nov. 5, 1996

[54] PRECIPITATION GAUGE FOR COLLECTING SOLID AND LIQUID PRECIPITATION

[75] Inventors: Douglas Balchin, Nepean; Henry Hayhoe, Manotick, both of Canada

[73] Assignee: Her Majesty the Queen in right of Canada as represented by Agriculture and Angri-Food Canada, Ottawa, Canada

[21] Appl. No.: 426,728

[22] Filed: Apr. 21, 1995

[51] Int. Cl.[6] .................................................. G01W 1/00
[52] U.S. Cl. ...................................... 73/170.21; 73/170.17
[58] Field of Search ............................. 73/170.17, 170.18, 73/170.19, 170.21, 170.23

[56] References Cited

U.S. PATENT DOCUMENTS

| | | | |
|---|---|---|---|
| 2,151,866 | 3/1939 | Nilsson | 73/170.18 |
| 2,497,759 | 2/1950 | Cappleman, Jr. | 73/170.18 |
| 2,507,206 | 5/1950 | Hunn et al. | 73/170.17 |
| 2,570,710 | 10/1951 | Quinteros | 73/170.17 |
| 2,954,690 | 10/1960 | Dickinson | 73/170.19 |
| 2,997,875 | 8/1961 | Moore | 73/862.633 |
| 2,997,876 | 8/1961 | Butzow | 73/170.17 |
| 3,216,246 | 11/1965 | Blondeau et al. | 73/170.25 |
| 3,958,457 | 5/1976 | Mink | 73/170.21 |
| 4,504,823 | 3/1985 | Berthel | 73/170.17 X |
| 5,284,052 | 2/1994 | Thompson | 73/170.17 X |
| 5,291,779 | 3/1994 | Govoni et al. | 73/170.17 |

*Primary Examiner*—Richard Chilcot
*Assistant Examiner*—Elizabeth L. Dougherty
*Attorney, Agent, or Firm*—McFadden, Fincham

[57] ABSTRACT

A precipitation gauge for collecting solid and liquid precipitation is provided. The gauge provides a container within which is disposed a liquid, the liquid is in contact with a collection surface extending at least partially above the container in order to expose the collection surface to the precipitation. A transfer system is provided to transfer the collected precipitation from the collection surface to the liquid. The arrangement provides for an accurate measurement of the collected precipitation.

9 Claims, 1 Drawing Sheet

PRECIPITATION GAUGE FOR COLLECTING SOLID AND LIQUID PRECIPITATION

FIELD OF THE INVENTION

The present invention relates to a precipitation gauge and more particularly, the present invention relates to a precipitation gauge for collecting liquid and solid precipitation.

BACKGROUND OF THE INVENTION

Precipitation gauges are well known in the art and there are a plethora of various devices which are employed for the collection of precipitation. As an example, manual measurements of snow have conventionally been taken using the Nipher gauge. This requires an observer to measure the depth of snow in the gauge and to melt the snow to determine the water equivalent of the precipitation.

In terms of automated sensors, there are two broad categories for these instruments, namely: heated and unheated arrangements. Heated arrangements have a heated surface that funnels the melted precipitation to a heated measuring device. These are typically retrofitted rain gauges that are used for liquid rain fall. Unheated solid precipitation gauges, frequently weigh the precipitation collected in a bucket or measure the pressure increase from precipitation collected in a drum. Various potentionmetric arrangements are known in the art as well.

The main drawback of the manual measurement arrangement is that they require an observer. Heated automated gauges are not recommended for sub-zero winter conditions because they have been attributed to effecting sublimation and evaporation and therefore are inaccurate in the sense that they underestimate precipitation. They also require a power source for the heat which limits them to sites with a hydro connection and therefore limits the utility in terms of portability applications.

In addition to the above, conventional arrangements require shielding to help improve the capture of, for example, blowing snow.

Turning to the automated systems, automated weighing or mass oriented gauges typically include chart recording gauges that have the chart replaced with a transducer to electrically output the signal measured by the spring weighing mechanism. These gauges are not well designed for winter precipitation because they have a deep "throat" that the snow has to pass to get to the weighing bucket to which the snow can adhere. The resolution of these gauges is typically not greater than 0.2 mm and the level of uncertainty is substantially higher. To compound the drawbacks of these systems, the cost of the arrangements is very significant and can approach $7,000.00 or greater.

In terms of specific prior art, U.S. Pat. No. 3,216,246, issued Nov. 9, 1965 to Blondeau et al., provides an atmospheric fall-out collector having a dual functioning collection surface. The apparatus is designed to collect dry fall-out, for example, dust and other particulate material by making use of an adhesive surface. Wet or liquid precipitation is collected by making use of a generally hemispherical deflector member which deflects the liquid downwardly into a funnel arrangement and further into a collection reservoir. Although a useful arrangement, the Blondeau et al. device would be limited in terms of its utility for collecting frozen precipitation.

Quinteros, in U.S. Pat. No. 2,570,710, issued Oct. 9, 1951, discloses a pluviometer having a receptacle to which is swingably mounted a collection reservoir in the form of a hollow semi-sphere. The semi-sphere additionally provides two wind vanes to direct the open semi-sphere into contact with the precipitation to be collected. The precipitation is then deposited into a receptacle to which the semi-sphere is rotatably mounted. Similar to the above-mentioned apparatus in the Blondeau disclosure, this apparatus would appear to be limited to the collection of liquid precipitation.

U.S. Pat. No. 3,958,457, issued May 25, 1976, to Mink, provides an electronically operated tipping bucket rain gauge where a rotary bucket wheel is positioned beneath and in fluid communication with a water column of collected rain. When the column exceeds a given height as determined by an electronic probe, the bucket is actuated and a predetermined water is removed from the bottom of the water column. Clearly, this apparatus would not be particularly useful in conditions where frozen precipitation is to be collected.

Govoni et al., in U.S. Pat. No. 5,291,779, issued Mar. 8, 1994, provide a snow collector wherein there is provided a receptacle adapted to receive a flexible liner for the collection of the precipitation. The Govoni et al. apparatus would appear to be limited to collection up to the point of the maximum volume of the flexible liner and subsequent to this, it would appear that collection would not be possible.

Additional prior art which is generally relevant to the precipitation collection art includes U.S. Pat. No. 2,954,690, issued Oct. 4, 1960, to Dickenson and U.S. Pat. No. 2,997,875, issued Aug. 29, 1961, to Moore and U.S. Pat. No. 2,497,795, issued Feb. 14, 1950, to Cappleman, Jr.

In view of what the prior art has previously proposed for precipitation collection, it is clear that there exists a need for an improved arrangement which is not limited to a specific volume collection and which can accurately provide a representative collection sample of any type of precipitation in any conditions without the inaccuracies typically associated with the prior art.

SUMMARY OF THE INVENTION

One object of the present invention is to provided an improved precipitation collector and more particularly a precipitation collector which is capable of collecting various forms of precipitation including frozen precipitation.

A further object of one embodiment of the present invention is to provide a precipitation gauge for collecting solid and liquid precipitation, comprising: a receptacle for receiving precipitation, the receptacle adapted to retain a second fluid; a precipitation collection surface extending at least partially above the receptacle in the second fluid for exposure to the precipitation; and means for transferring collected precipitation from the collection surface to the second fluid.

It has been found that by making use of a fluid in the receptacle which fluid has a lower freezing point than the precipitation, that significant advantages can be realized. One such advantage is that evaporation of the collected material is no longer a consideration since a heating means is not provided which would otherwise tend to evaporate the collected precipitation. By making use of a fluid having the abovementioned property, an example of which is automotive antifreeze, the precipitation can be collected and, when frozen, melted while maintaining a cool fluid temperature. This has additional advantages in terms of the lack of expenditures for energy purposes which would otherwise be attributed to an apparatus having heating means.

Regarding the collection surface, the same may comprise a fixed surface in the fluid onto which may be pumped or deposited in impulses the second fluid, i.e. the antifreeze. In this manner, a dynamic collection surface is provided where the fluid flow is moving over the surface of the collection surface to therefore "sweep" the collected material into the receptacle.

Alternatively, the collection surface may comprise a generally arcuate hollow body which is elevated above the up level of the receptacle for exposure to precipitation. Where pumping is not provided for the antifreeze fluid, the collection surface may be rotated within the second fluid to achieve the dynamic surface.

A further object of one embodiment of the present invention is to provide a precipitation gauge for collecting liquid or solid precipitation, comprising: a receptacle having an open top for receiving precipitation, the receptacle adapted to retain a second fluid; a movable collection surface for positioning at least partially in the second fluid and at least partially above the open top; and measuring means for measuring an amount of collected precipitation.

In one possible form, the collection surface may comprise a hollow spherical member at least partially immersed in the antifreeze. In order to enhance the contact of the precipitation onto the collection surface, the surface may be textured, for example, with projections or with grooves and/or apertures in order to assist in retention of the antifreeze over the entire area of the collection surface or the collection surface may be formed of a material which is attracted to the antifreeze material. Further still, it will be appreciated that the addition of surfactants, etc. to the collection surface may be employed in order to enhance the wettability of the surface to the antifreeze. Other possibilities will be clearly within the purview of one skilled in the art.

A supply of the second fluid will be provided for in order to maintain the level of the liquid in the receptacle at a constant level and to make up for losses which will inherently occur due to evaporation. To this end, a supply reservoir will be provided and may additionally include sensors for sensing the level of liquid in the reservoir, which sensors may optionally be connected to a valve mechanism for supplying the required volume of the second fluid to the receptacle.

In terms of the detection of the volume of precipitation, the increase in volume will be removed from the receptacle by a suitable means, an example of which may comprises a tipping bucket mechanism or the apparatus may include a volumetric container for determining precisely the amount of precipitation collected. In addition, it will be appreciated that the collected precipitation may be collected and subsequently sent on to various analysis means, e.g. mass spectrometers, spectrophotometers, gas chromatography apparatus, etc. in order to analyze the chemical constituents present in the precipitation.

In order to provide movement to the collection surface where a pumping apparatus is not provided, the precipitation gauge may include a motor for effecting rotation of the collection surface which motor may comprise a DC servo motor or a solar powered arrangement.

A still further object of the present invention is to provide a method of collecting liquid or solid frozen precipitation, comprising the steps of: providing a precipitation collection surface for collecting precipitation; providing the collection surface with a movable liquid surface; exposing the collection surface to precipitation; and collecting precipitation.

Having thus generally described the invention, reference will now be made to the accompanying drawing illustrating a preferred embodiment.

DETAILED DESCRIPTION OF THE PREFERRED EMBODIMENTS

Figure 1:
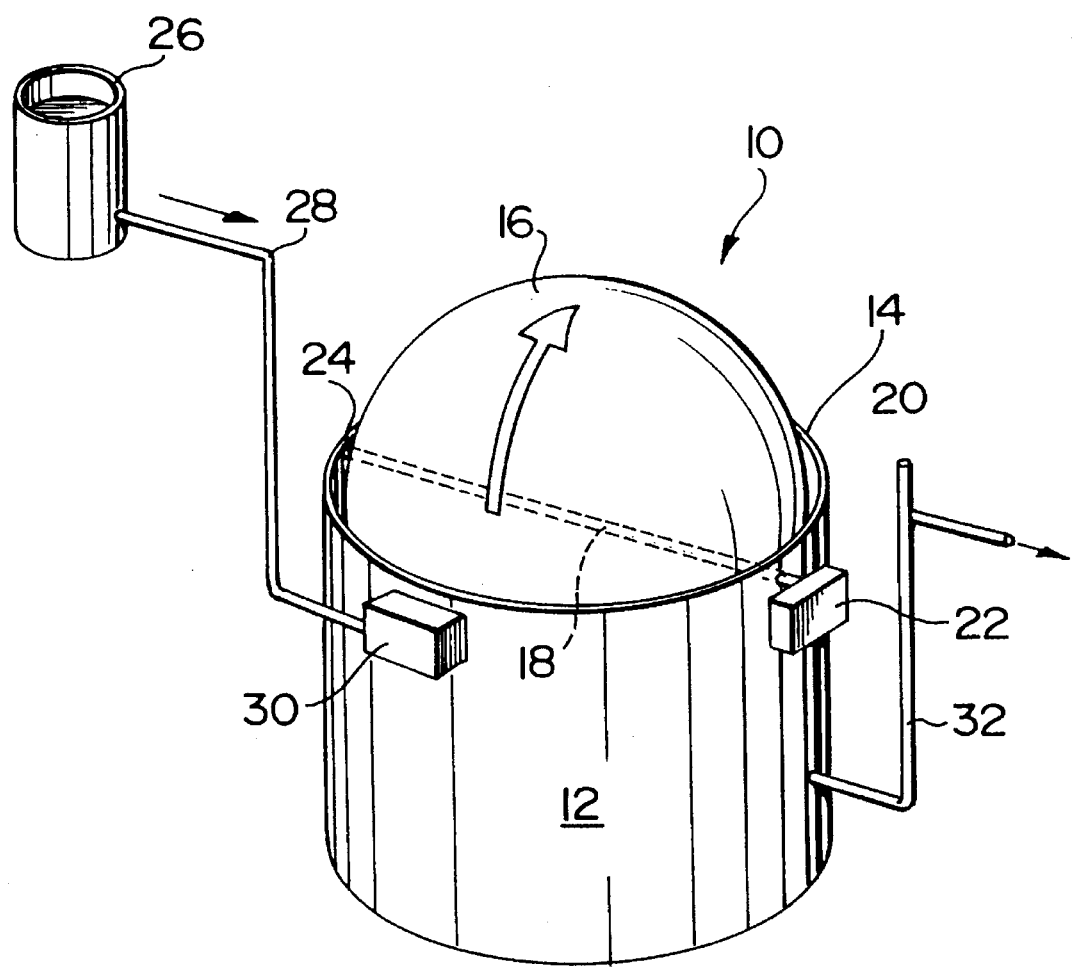
FIG. 1 is a schematic illustration of the apparatus according to one embodiment of the present invention.

Referring now to the drawing, shown is a generally schematic illustration of one embodiment of the present invention. The gauge, generally denoted by numeral 10, includes a main receptacle 12 having an open top 14. The receptacle 12 is adapted to receive a liquid, a preferred example of which is a liquid having a lower freezing point than snow or hail precipitation. Suitable material subscribing to this property may be antifreeze.

Mounted for rotation within receptacle 12 and more specifically, within the fluid therein, is a collection surface 16, which collection surface is preferably arcuate and positioned at least partially above the top 14 of receptacle 12 for exposure to precipitation (not shown).

One form of possible mounting of the collection surface 16 to receptacle 12 is an axle 18 extending through the collection surface 16 for rotatable mounting in the top 14 of receptacle 12. One end 20 of axle 18 may be connected to a motor 22 to effect rotation of the axle 18 and more specifically, surface 16. End 24 of axle 18 may include a bearing (not shown) in wall 14 of receptacle 12 to effect smooth rotational mounting of the axle 18.

The motor 22 rotates the collection surface 16 in the direction of the arrow shown in the drawing. In one form, the collection surface 16 may comprise a hollow sphere.

A make up supply reservoir 26 will be provided for transferring "make up", antifreeze or other suitable liquid to the receptacle 12. To this end, a line 28, running from reservoir 26 to receptacle 12, is provided. Line 28 may terminate at a sensor device 30, which sensor device may include valves (not shown) for supplying additional fluid to receptacle 12 when required.

A line 32 could be provided for removing collected melted precipitation from within receptacle 12 and for passage onto a gauge, or other analysis means such as a liquid chromatograph, gas chromatograph, spectrophotometer, etc.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A precipitation gauge for collecting solid and liquid precipitation, comprising:

a receptacle for receiving precipitation, said receptacle for retaining a second fluid in addition to said precipitation, said second fluid comprising a fluid having a freezing point less than said precipitation;

a convex precipitation collection Surface extending at least partially above said receptacle in said second fluid for exposure to said precipitation;

means for introducing said second fluid over said collection surface to transfer collected precipitation into said second fluid;

means for measuring collected precipitation; and means for supplying said second fluid to receptacle.

2. The precipitation gauge as set forth in claim 1, wherein said second fluid comprises anti-freeze.

3. A precipitation gauge for collecting liquid or solid precipitation, comprising:

a receptacle having an open top for receiving precipitation, said receptacle for retaining a second fluid in addition to said precipitation;

a movable hollow spherical precipitation collection surface for positioning at least partially in said fluid and at least partially above said open top;

a measuring means for measuring an amount of collected precipitation; and drive means for driving said spherical precipitation collection surface into contact with said second fluid whereby collected precipitation is transferred into said second fluid.

4. A precipitation gauge as set forth in claim 3, wherein said means comprises motor means.

5. A precipitation gauge as set forth in claim 3, wherein said second fluid comprises a liquid having a lower freezing point than said precipitation.

6. An apparatus set forth in claim 5, further including means for supplying said second fluid to said receptacle.

7. An apparatus as set forth in claim 6, wherein said second fluid comprises antifreeze.

8. A method of collecting liquid or solid frozen precipitation, comprising the steps providing a rotatable precipitation collection surface for collecting precipitation in a receptacle;

at least partially immersing said collection surface in anti-freeze to wet said collection surface:

exposing said collection surface to precipitation;

applying additional anti-freeze to said collection surface;

to transfer collected precipitation into said antifreeze in said receptacle; and collecting precipitation in said antifreeze in said receptacle.

9. The method as set forth in claim 8, wherein said apparatus further includes control means for controlling said supply of antifreeze.

\* \* \* \* \*

UNITED STATES PATENT AND TRADEMARK OFFICE
CERTIFICATE OF CORRECTION

PATENT NO. : 5,571,963
DATED : November 5, 1996
INVENTOR(S) : Douglas Balchin and Henry Hayhoe It is certified that error appears in the above-indentified patent and that said Letters Patent is hereby corrected as shown below:

On title page, item [73]
Please correct the Assignee's name to read

--HER MAJESTY THE QUEEN IN RIGHT OF CANADA AS REPRESENTED

BY AGRICULTURE AND AGRI-FOOD CANADA--.

Signed and Sealed this

Fourth Day of February, 1997

Attest:

BRUCE LEHMAN

*Attesting Officer*  *Commissioner of Patents and Trademarks*